United States Patent
Fukumoto et al.

(10) Patent No.: US 8,158,214 B2
(45) Date of Patent: Apr. 17, 2012

(54) PHOTOCURABLE INK COMPOSITION SET, INK JET RECORDING METHOD, AND RECORDED MATTER

(75) Inventors: Hiroshi Fukumoto, Suwa (JP); Keitaro Nakano, Suwa (JP); Takashi Oyanagi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 860 days.

(21) Appl. No.: 12/188,572

(22) Filed: Aug. 8, 2008

(65) Prior Publication Data

US 2009/0041946 A1   Feb. 12, 2009

(30) Foreign Application Priority Data

Aug. 8, 2007 (JP) ................. 2007-207237

(51) Int. Cl.
   *C08J 7/04* (2006.01)
   *C08F 2/50* (2006.01)
(52) U.S. Cl. ............ 427/511; 522/16; 522/68; 522/104; 522/130; 522/182; 524/1
(58) Field of Classification Search .......... 427/511; 522/16, 68, 104, 130, 182; 524/1
See application file for complete search history.

(56) References Cited

U.S. PATENT DOCUMENTS

| | | |
|---|---|---|
| 4,507,466 A | 3/1985 | Tomalia et al. |
| 4,558,120 A | 12/1985 | Tomalia et al. |
| 4,568,737 A | 2/1986 | Tomalia et al. |
| 4,587,329 A | 5/1986 | Tomalia et al. |
| 4,631,337 A | 12/1986 | Tomalia et al. |
| 4,694,064 A | 9/1987 | Tomalia et al. |
| 5,041,516 A | 8/1991 | Freichet et al. |
| 2004/0166249 A1* | 8/2004 | Siegel ................ 427/558 |
| 2007/0249750 A1* | 10/2007 | Oyanagi et al. ........... 522/84 |
| 2008/0090930 A1* | 4/2008 | Madhusoodhanan et al. .. 522/83 |

FOREIGN PATENT DOCUMENTS

| | | |
|---|---|---|
| JP | 2004-099796 | 4/2004 |
| JP | 2006176734 A | 7/2006 |
| JP | 2007100054 A | 4/2007 |
| JP | 2007-182536 | 7/2007 |
| JP | 2007-314744 | 12/2007 |
| JP | 2007-314775 | 12/2007 |
| JP | 2008-120991 | 5/2008 |
| WO | 03089486 A1 | 10/2003 |

* cited by examiner

*Primary Examiner* — Timothy J. Kugel

(74) *Attorney, Agent, or Firm* — Nutter McClennen & Fish LLP; John J. Penny, Jr.

(57) ABSTRACT

A photocurable ink composition set includes ink composition A and ink composition B. Ink composition A contains a dendritic polymer and an monomer expressed by general formula (1): $CH_2=CR^1-COO-R^2-O-CH=CH-R^3$. Ink composition B contains a coloring agent and a monomer expressed by general formula (1). In the formula (1), $R^1$ represents a hydrogen atom or a methyl group, $R^2$ represents an organic moiety having a carbon number in the range of 2 to 20, and $R^3$ represents a hydrogen atom or an organic moiety having a carbon number in the range of 1 to 11.

10 Claims, No Drawings

PHOTOCURABLE INK COMPOSITION SET, INK JET RECORDING METHOD, AND RECORDED MATTER

BACKGROUND

1. Technical Field

The present invention relates to a photocurable ink composition set, and an ink jet recording method and recorded matter using the same.

2. Related Art

Photocurable ink compositions are increasingly being used for manufacture of color filters, printing on print boards and plastic materials such as plastic cards, plastic sheets, and plastic components, printing for large sign boards and outdoor and indoor advertisements, and printing of bar codes and dates.

Japanese Unexamined Patent Application Publication No. 2004-99796 discloses a photocurable ink composition containing a dendrimer, which is a type of dendritic polymer. Dendritic polymers have a molecular structure in which functional groups are more closely present at the surface than general linear polymers, and are therefore expected as functional nano-polymer materials.

Unfortunately, the addition of a dendritic polymer to an ink composition significantly increases the viscosity of the ink. The increase of the viscosity may cause the ink jet head to fail the ejection of the ink. In order to prevent the increase of the viscosity of the ink composition, the dendritic polymer content may be reduce. However, this cancels the effect of the dendritic polymer to increase the characteristics of the ink composition.

In order to prevent the increase of the viscosity of an ink, a low-viscosity polymerizable compound is generally used as a diluent monomer. However, low-viscosity monomers generally have low molecular weights, and often have low flash points and odors and cause skin irritation, thus having health and safety issues. Alternatively, water or an organic solvent having no polymerizable functional group may be added as a low-viscosity diluent. The addition of such a constituent not involved in curing reaction, however, undesirably requires additional, special treatment and increases the load of the manufacturing process. For example, a drying step may be performed by heating or blowing before curing, or an absorption layer may be formed on the print medium. If curing reaction is conducted before the additive is completely dried, air bubbles may be generated from the residual solvent or water by heat for polymerization, or the residual solvent or water may bleed from the cured composition to remain at the surface and cause tackiness.

In addition, many photocurable ink compositions are unstable in storage, and their viscosities are increased to gelate. This is because the ink composition is itself reactive, and is intrinsically disadvantageous. It is self-evident that as the curing reactivity is increased, the storage stability is degraded. Accordingly, a large amount of thermal polymerization inhibiter inhibiting dark reactions is added to the ink composition for storage stability. This however inhibits the polymerization for curing the ink and makes it difficult to form appropriate images. In particular, it is important to enhance much the storage stability of the dendrimer or hyperbranched polymer, which has a molecular structure in which polymerizable functional groups are closely and convergently disposed at the outermost surface. For use of a dendritic polymer in an ink composition, a two-part ink composition set including two compositions is effective which are stored in two parts and mixed before use.

SUMMARY

Accordingly, an advantage of some aspects of the invention is that it provides a low-viscosity, safe, storage-stable, highly curable photo-curable ink composition set that can be cured to form a high quality film, and an ink jet recording method and recorded matter using the photocurable ink composition set. According to an aspect of the invention, a photo-curable ink composition set is provided which includes ink composition A containing a dendritic polymer and an monomer expressed by general formula (1): $CH_2=CR^1-COO-R^2-O-CH=CH-R^3$; and ink composition B containing a coloring agent and a monomer expressed by general formula (1). In general formula (1), $R^1$ represents an hydrogen atom or a methyl group, $R^2$ represents an organic moiety having a carbon number in the range of 2 to 20, and $R^3$ represents a hydrogen atom or an organic moiety having a carbon number in the range of 1 to 11.

Preferably, the dendritic polymer is at least one of a dendrimer and a hyperbranched polymer.

Preferably, the monomers in ink compositions A and B are at least one compound of 2-(vinyloxyethoxy)ethyl acrylate and 2-(vinyloxyethoxy)ethyl methacrylate.

Preferably, the dendritic polymer content in ink composition A is in the range of 3% to 30% by weight.

Preferably, the ink composition B further contains a photopolymerization initiator.

Preferably, the photo polymerization initiator contains at least one selected from the group consisting of -amino ketones, -hydroxy ketones, and acylphosphine oxides.

According to another aspect of the invention, a ink jet recording method is provided which includes recording with the photocurable ink composition set.

According to still another aspect of the invention, recorded matter is provided which is made by recording with the photocurable ink composition set.

The ink composition set of the invention has a low viscosity and a storage stability, and is safe and highly curable. It is also cured to form a high quality film. The ink jet recording method of the invention can safely be performed and enhance the curing speed and the quality of the resulting film. The recorded matter of the invention exhibits high quality.

DESCRIPTION OF EXEMPLARY EMBODIMENTS

The invention will be further illustrated with reference to a preferred embodiment of the invention.

Photo-Curable Ink Composition Set

The photo-curable ink composition set according to an embodiment of the invention is a two-part ink composition set including ink composition A and ink composition B. Ink composition A contains a dendritic polymer and a monomer expressed by general formula (1): $CH_2=CR^1-COO-R^2-O-CH=CH-R^3$ ($R^1$ represents a hydrogen atom or a methyl group; $R^2$ represents an organic moiety having a carbon number in the range of 2 to 20; and $R^3$ represents a hydrogen atom or an organic moiety having a carbon number in the range of 1 to 11). Ink composition B contains a coloring agent and a monomer expressed by general formula (1).

In the present embodiment, the dendritic polymer and the coloring agent, which generally increase the viscosity of ink compositions, are contained separately in the respective ink compositions to prevent the viscosity of the ink composition from increasing. By adding a dendritic polymer to ink composition A, the mixture of ink compositions A and B can easily be cured, and the cured ink exhibits high quality. In order to prevent the added dendritic polymer from increasing the viscosity, a monomer is added to ink composition A. Ink composition B also contains a monomer as a disperse medium in which the coloring agent is dispersed. Since the monomers used in the embodiment contribute to polymerization, additional treatment, such as drying, is not required.

Although a general low-viscosity monomer has a low flash point and has a problem in safety in adding it to ink composition A or B, the monomers used in the embodiment expressed by general formula (1) can prevent the decrease of the flash point of the ink compositions and accordingly enhance the safety. In addition, the monomers used in the compositions are highly curable. The dendritic polymer is reactive with photopolymerization initiators. Accordingly only composition B contains a photopolymerization initiator so that the dendritic polymer avoids coming into contact with the photopolymerization initiator before mixing the compositions. This is advantageous in view of the storage stability of not only composition A, but also composition B, because coloring agents generally have radical trapping ability.

Ink Composition A

Constituents of ink composition A and ink composition B will be described respectively.

Ink composition A contains a dendritic polymer and a monomer expressed by general formula (1): $CH_2=CR^1-COO-R^2-O-CH=CH-R^3$ ($R^1$ represents a hydrogen atom or a methyl group; $R^2$ represents an organic moiety having a carbon number in the range of 2 to 20; and $R^3$ represents a hydrogen atom or an organic moiety having a carbon number in the range of 1 to 11). Preferably, ink composition A does not contain a coloring agent or photopolymerization initiator to avoid mixing with dendritic polymer and thus to enhance the storage stability.

Dendritic polymers that can be added to ink composition A are generally classified into six structures as follows (see "Dendritic Polymers—Tabunki kouzou ga hirogeru koukinou-ka no sekai (Dendritic Polymers—highly functional world spread by multi-branched structure—)", edited by K. Aoki and M. Kakimoto, NTS Inc.):

I: dendrimers;
II: linear dendritic polymers;
III: dendrigraft polymers;
IV: hyperbranched polymers;
V: star hyperbranched polymers; and
VI: hypergraft polymers While dendritic polymers I to III have a degree of branching (DB) of 1 and no defect, dendritic polymers IV to VI have randomly branched structures that may include a defect. In particular, dendrimers allow their reactive functional groups to be disposed closely at the outermost surface in comparison with generally used linear polymers and are expected as functional polymer materials. Hyperbranched polymers also allow, but not more than dendrimers, many reactive functional groups to be introduced to the outermost surface, and are superior in capability of being cured.

Unlike generally used linear or branched polymers, the dendritic polymer repeats a three-dimensionally branched structure and is thus highly branched. Accordingly, the dendritic polymer can have a lower viscosity than the linear polymer having the same molecular weight.

The dendrimer used in the present embodiment can be synthesized by a divergent method that conducts the synthesis outward from the center or by a convergent method that conducts the synthesis inward from the outside.

Preferably, a dendrimer or a hyperbranched polymer is used as the dendritic polymer. The dendrimer or the hyperbranched polymer is preferably solid at room temperature and has a number average molecular weight in the range of 1000 to 100,000, and more preferably in the range of 2,000 to 50,000. If the dendritic polymer is not solid at room temperature, the resulting image cannot be maintained favorably. If the molecular weight is lower than the above range, fixed images are brittle. If the molecular weight is higher than the above range, the resulting ink has an excessively high viscosity and is thus impracticable even if the dendritic polymer content is reduced.

The dendrimer or hyperbranched polymer used in the present embodiment preferably has radically polymerizable functional group at the outermost surface. Such a structure promotes polymerization.

Examples of the polymer having a dendrimer structure include amide amine dendrimers (U.S. Pat. Nos. 4,507,466, 4,558,120, 4,568,737, 4,587,329, 4,631,337, and 4,694,064) and phenyl ether dendrimers (U.S. Pat. No. 5,041,516 and Journal of American Chemistry Vol. 112 (1990, pp. 7638-7647)). An amido amine dendrimer named "Starburst™ (PAMAM)" having a terminal amino group and a methyl carboxylate group is commercially available from Aldrich. The terminal amino group of the amide amine dendrimer may be reacted with an acrylic acid derivative or a methacrylic acid derivative to synthesize an amide amine dendrimer having a desired terminal.

Examples of the acrylic acid derivative and the methacrylic acid derivative include, but not limited to, alkyl acrylates or methacrylates, such as methyl(meth)acrylate, ethyl (meth) acrylate, n-butyl(meth)acrylate, t-butyl(meth)acrylate, cyclohexyl(meth)acrylate, palmityl(meth)acrylate, and stearyl(meth)acrylate; and amide acrylates; and alkylamido acrylates or methacrylates, such as isopropylamido(meth) acrylate.

The above cited document Journal of American Chemistry Vol. 112 (1990, pp. 7638-7647) gives many phenyl ether dendrimers. According to the document, for example, 3,5-dihydroxybenzyl alcohol is reacted with 3,5-diphenoxybenzyl bromide to synthesis a second generation benzyl alcohol. The OH group of the benzyl alcohol is replaced with Br using $CBr_4$ and triphenylphosphine, and then the product is reacted with 3,5-dihydroxybenzyl alcohol to synthesis a next generation benzyl alcohol. The above reaction is thus repeated to synthesis a desired dendrimer. In the phenyl ether dendrimer, the terminal benzyl ether bond can be replaced with a variety of chemical structure. For example, in the synthesis of a dendrimer described in the document Journal of American Chemistry Vol. 12, an alkyl halide is used as an alternative to benzyl bromide to produce a phenyl ether dendrimer having a terminal structure including a desired alkyl group. Polyamine dendrimers (Macromol. Symp. 77, 21 (1994)) and their derivatives whose terminal group has been modified can be used.

Hyperbranched polyethylene glycols can be used as the hyperbranched polymer. The hyperbranched polymer is produced by synthesizing a target polymer in a single step using a monomer having the same type of at least two reaction points corresponding to branch points and another type of only one reaction point corresponding to a binding point (Macromolecules, vol. 29 (1996), pp. 3831-383). The hyperbranched polymer may contain, for example, 3,5-dihydroxybenzoic acid derivatives as the monomer. The hyperbranched polymer can be produced by, for example, heating methyl 3,5-bis((8'-hydroxy-3',6'-dioxaoctyl)oxy)benzoate, which is a hydrolysate of methyl 3,5-bis((8'-(t-butyldiphenylsiloxy)-3',6'-dioxaoctyl)oxy)benzoate produced from 1-bromo-8-(t-butyldiphenylsiloxy)-3,6-dioxaoctane and methyl 3,5-dihydroxybenzoate, with dibutyltin diacetate in a nitrogen atmosphere. Thus, a hyperbranched polymer, poly[bis(triethylene glycol)benzoate], is synthesized.

In use of 3,5-dihydroxy benzoic acid, the terminal group of the hyperbranched polymer is the hydroxy group. By allowing appropriate alkyl halides to act on the hydroxy group, hyperbranched polymers having a variety of terminal group can be synthesized.

The characteristics of monodisperse polymers having dendrimer structures and hyperbranched polymers depend on the chemical structures of the main chain and its terminal group, and are particularly varied depending on the terminal group and the substituents of the chemical structure. In particular, structures having a polymerizable group at the terminal are reactive and accordingly exhibit high effect of gelation after optical reaction. A dendrimer having a polymerizable group can be produced by chemically modifying the terminal of a structure having a basic atomic group, such as amino, substituted amino, or hydroxyl, at the terminal with a compound having a polymerizable group.

For example, a polyfunctional compound produced by Michael addition of an active hydrogen-containing (meth)acrylate compound to an amino dendrimer is subjected to addition reaction with an isocyanate group-containing vinyl compound. An amino dendrimer may be reacted with (meth)acryloyl chloride or the like. Thus, a dendrimer having a polymerizable group at the terminal can be produced. Exemplary vinyl groups giving a polymerizable group have radically polymerizable ethylenic unsaturated bonds, including unsaturated carboxylic acids, such as acrylic acid, methacrylic acid, itaconic acid, crotonic acid, isocrotonic acid, and maleic acid, and salts of these acids. These compounds have a variety of radically polymerizable ethylenic unsaturated bonds as will be described later.

Terminal groups having cationic polymerizable groups can also be the polymerizable group. Such a group can be introduced by a reaction with an amino dendrimer and a compound having a polymerizable group (for example, an epoxy or oxetanyl group) that can be polymerized by cationic polymerization. Such compounds include cyclic ether compounds such as oxirane and oxetane compounds, alicyclic polyepoxides, polybasic acid polyglycidyl esters, and polyhydric alcohol polyglycidyl ethers. For example, chloromethyl oxirane may be reacted with an amino dendrimer to introduce an epoxy-type cationic polymerizable group to the terminal. Other terminal groups include cationic polymerizable groups selected from among styrene derivatives, vinyl naphthalene derivatives, vinyl ethers, and N-vinyl compounds.

In the present embodiment, the dendrimer or the hyperbranched polymer may be used singly or in combination with other type of dendrimer or hyperbranched polymer.

The hyperbranched polymer is available as Biscoat #1000 from Osaka Organic Chemical Industry Ltd.

The dendritic polymer content in ink composition A is preferably 3% to 30% by weight, more preferably 5% to 25% by weight. A dendritic polymer content of less than 3% by weight results in an insufficient film quality after curing, and a dendritic polymer content of more than 30% by weight leads to an increased viscosity of the ink composition.

Preferably, vinyl ether-containing (meth)acrylic esters expressed by general formula (1) are used as the monomer:

$$CH_2=CR^1-COO-R^2-O-CH=CH-R^3 \qquad (1)$$

where $R^1$ represents a hydrogen atom or a methyl group; $R^2$ represents an organic moiety having a carbon number in the range of 2 to 20; and $R^3$ represents a hydrogen atom or an organic moiety having a carbon number in the range of 1 to 11. The monomer may be used singly or in combination with other vinyl ether-containing (meth)acrylic esters expressed by the above general formula (1).

Examples of the organic moiety having a carbon number in the range of 2 to 20 represented by $R^2$ in general formula (1) include normal, branched, or cyclic alkylene groups having carbon numbers in the range of 2 to 20, alkylene groups containing oxygen of an ether bond and/or an ester bond in the structure and having carbon numbers in the range of 2 to 20, substituted or unsubstituted aromatic groups having carbon numbers in the range of 6 to 11. Among these preferred are alkylene groups having carbon numbers in the range of 2 to 6 and alkylene groups containing oxygen of an ether bond in the structure and having carbon numbers in the range of 2 to 9. Examples of the organic moiety having a carbon number in the range of 1 to 11 represented by $R^3$ in general formula (1) include normal, branched, or cyclic alkyl groups having carbon numbers in the range of carbon number 1 to 10, and substituted or unsubstituted aromatic groups having carbon numbers in the range of 6 to 11. Among these preferred are alkyl groups having carbon numbers in the range of 1 to 2 and aromatic groups having carbon numbers in the range of 6 to 8.

Exemplary monomers expressed by general formula (1) include 2-vinyloxyethyl(meth)acrylate, 3-vinyloxypropyl(meth)acrylate, 1-methyl-2-vinyloxyethyl(meth)acrylate, 2-vinyloxypropyl(meth)acrylate, 4-vinyloxybutyl(meth)acrylate, 1-methyl-3-vinyloxypropyl(meth)acrylate, 1-vinyloxymethylpropyl(meth)acrylate, 2-methyl-3-vinyloxypropyl(meth)acrylate, 3-methyl-3-vinyloxypropyl(meth)acrylate, 1,1-dimethyl-2-vinyloxyethyl(meth)acrylate, 3-vinyloxybutyl(meth)acrylate, 1-methyl-2-vinyloxypropyl(meth)acrylate, 2-vinyloxybutyl(meth)acrylate, 4-vinyloxycyclohexyl(meth)acrylate, 5-vinyloxypentyl(meth)acrylate, 6-vinyloxyhexyl(meth)acrylate, 4-vinyloxymethylcyclohexylmethyl(meth)acrylate, p-vinyloxymethylphenylmethyl(meth)acrylate, 2-(vinyloxyethoxy)ethyl(meth)acrylate, 2-(vinyloxyisopropoxy)ethyl(meth)acrylate, 2-(vinyloxyethoxy)propyl(meth)acrylate, 2-(vinyloxyethoxy)isopropyl(meth)acrylate, 2-(vinyloxyisopropoxy)propyl(meth)acrylate, 2-(vinyloxyisopropoxy)isopropyl(meth)acrylate, 2-(vinyloxyethoxyethoxy)ethyl(meth)acrylate, 2-(vinyloxyethoxyisopropoxy)ethyl(meth)acrylate, 2-(vinyloxyisopropoxyethoxy)propyl(meth)acrylate, 2-(vinyloxyethoxyethoxy)isopropyl(meth)acrylate, 2-(vinyloxyethoxyisopropoxy)isopropyl(meth)acrylate, 2-(vinyloxyethoxyethoxyethoxy)ethyl(meth)acrylate, polyethylene glycol monovinyl ether(meth)acrylate, and polypropylene glycol monovinyl ether(meth)acrylate.

Among these preferred are 2-(vinyloxyethoxy)ethyl(meth)acrylate, that is, 2-(vinyloxyethoxy)ethyl acrylate (hereinafter may be referred to as VA) and 2-(vinyloxyethoxy)ethyl methacrylate (hereinafter may be referred to as VM). These monomers have low viscosities and high flash points and highly help the ink composition set to be cured. VA more helps the ink composition set to be cured than VM.

The monomer can be produced by esterifying (meth)acrylic acid and a hydroxy group-containing vinyl ether (method A), esterifying a (meth)acryloyl halide and a hydroxy group-containing vinyl ether (method B), esterifying (meth)acrylic anhydride and a hydroxy group-containing vinyl ether (method C), transesterifying a (meth)acrylic ester and a hydroxy group-containing vinyl ether (method D), esterifying (meth)acrylic acid and a halogen-containing vinyl ether (method E), or esterifying an alkali or alkaline-earth metal (meth)acrylate and a halogen-containing vinyl ether (method F). Among these preferred is method D transesterifying a (meth)acrylic ester and a hydroxy group-containing vinyl ether. This method can fully produce the effects of the invention.

The monomer content in ink composition A is preferably 20% to 90% by weight, and more preferably 30% to 80% by weight.

Ink Composition B

Ink composition B contains a coloring agent and a monomer expressed by general formula (1). In addition, a photopolymerization initiator is preferably added to ink composition B rather than to ink composition A from the viewpoint of avoiding the contact with the dendritic polymer. Thus, the storage stability is ensured.

The coloring agent may be a pigment or a dye. Pigments are particularly advantageous from the viewpoint of enhancing the durability of the resulting printed matter.

The dye may be selected from various types generally used for ink jet recording, including direct dyes, acid dyes, food dyes, basic dyes, reactive dyes, disperse dyes, vat dyes, soluble vat dyes, and reactive disperse dyes.

The pigment may be selected from any type without particular limitation, including inorganic pigments and organic pigments. Exemplary inorganic pigments include titanium oxide, iron oxide, and carbon black produced by known methods, such as the contact method, the furnace method, and the thermal method. Exemplary organic pigments include azo pigments, such as azo lake, insoluble azo pigments, condensed azo pigments, and chelate azo pigments; polycyclic pigments, such as phthalocyanine pigments, perylene pigments, perinone pigments, anthraquinone pigments, quinacridone pigments, dioxazine pigments, thioindigo pigments, isoindolinone pigments, and quinofuralone pigments; dye chelates, such as basic dye chelates and acid dye chelates; nitro pigments; nitroso pigments; and aniline black.

More specifically, examples of carbon black include C. I. Pigment Black 7; No. 2300, No. 900, MCF88, No. 33, No. 40, No. 45, No. 52, MA7, MA8, MA100, and No. 2200B produced by Mitsubishi Chemical; Raven 5750, Raven 5250, Raven 5000, Raven 3500, Raven 1255, and Raven 700 produced by Columbia; Regal 400R, Regal 330R, Regal 660R, Mogul L, Mogul 700, Monarch 800, Monarch 880, Monarch 900, Monarch 1000, Monarch 1100, Monarch 1300, and Monarch 1400 produced by Cabot; and Color Blacks FW 1, FW 2, FW 2V, FW 18 and FW 200, Color Blacks S 150, S 160 and S 170, Printex 35, Printex U, Printex V, Printex 140U, Special Black 6, Special Black 5, Special Black 4A, and Special Black 4 produced by Degussa.

Pigments used for yellow ink include C. I. Pigment Yellows 1, 2, 3, 12, 13, 14, 16, 17, 73, 74, 75, 83, 93, 95, 97, 98, 109, 110, 114, 120, 128, 129, 138, 150, 151, 154, 155, 180, 185, and 213. Pigments used for magenta ink include C. I. Pigment Reds 5, 7, 12, 48(Ca), 48(Mn), 57(Ca), 57:1, 112, 122, 123, 168, 184, 202, and 209 and C. I. Pigment Violet 19.

Pigments used for cyan ink include C. I. Pigment Blues 1, 2, 3, 15:3, 15:4, 60, 16, and 22.

In the present embodiment, preferably, the pigments have average particle size in the range of 10 to 200 nm, and more preferably in the range of about 50 to 150 nm. The coloring agent content in ink composition B is preferably in the range of 0.1% to 25% by weight, and more preferably in the range of about 0.5% to 15% by weight.

A plurality of color compositions B may be prepared for each fundamental color. If a dark or a light color is used in addition to each of the four fundamental colors: yellow, magenta, cyan, and black, for example, light magenta may be used in addition to magenta; light cyan may be used in addition to deep red and cyan; gray, light black, or matte black (deep black) may be used in addition to deep blue or black.

When a pigment is used as the coloring agent, ink composition B preferably contains a dispersant. The dispersant can be, for example, a polyoxyalkylene-polyalkylene-polyamine $(C_2H_4N)_n$—$(PO)_x$-$(EO)_y$—OH (wherein n, x, and y each represents an integer of 1 or more, PO represents propylene oxide, and EO represents ethylene oxide). Exemplary polyoxyalkylene-polyalkylene-polyamines include Discoles N-503, N-506, N-509, N-512, N-515, N-518, and N-520.

The dispersant content is preferably in the range of 0.1% to 20% by weight, and more preferably in the range of 0.5% to 10% by weight.

For ink composition B, the monomer is expressed by general formula (1) as in ink composition A, and may be the same as or different from the monomer used in ink composition A as long as it is selected from among monomers expressed by general formula (1). The monomer may be used singly or in combination with another vinyl ether group-containing (meth)acrylic ester expressed by general formula (1).

The monomer content in ink composition B is preferably in the range of 20% to 90% by weight, and more preferably in the range of 30% to 80% by weight.

The photopolymerization initiator can be selected from substances sensitive to active light emitted, such as ultraviolet light of 400 to 200 nm in wavelength, far-ultraviolet light, g-line, h-line, i-line, KrF excimer laser light, ArF excimer laser light, electron beams, X rays, molecular beams, or ion breams.

Any photopolymerization initiator known by those skilled in the art can be used without limitation. Many of such photopolymerization initiators are described in Bruce M. Monroe et al., Chemical Revue, 93, 435 (1993); R. S. Davidson, Journal of Photochemistry and biology A, Chemistry, 73. 81 (1993); J. P. Faussier, "Photoinitiated Polymerization—Theory and Applications", Rapra Review vol. 9, Report, Rapra Technology (1998); and M. Tsunooka et al., Prog. Polym. Sci., 21, 1 (1996). "Imaging yo Yuki Zairyo (Imaging Organic Material)" compiled by The Japanese Research Association for Organic Electronics Materials, published by Bun-shin Shuppan (1993), pp. 187-192 describes many of the chemically amplified photoresists and the compounds used for photocationic polymerization. In addition, compounds that cause oxidative or reductive bond cleavage through interaction with a sensitizing dye in electron-excited state are known, as described in, for example, F. D. Saeva, Topics in Current Chemistry, 156, 59 (1990), G. G. Maslak, Topics in Current Chemistry, 168, 1 (1993), H. B. Shuster et al., JACS, 112, 6329 (1990), and I. D. F. Eaton et al., JACS, 102, 3298 (1980).

Exemplary preferred photopolymerization initiators include (a) aromatic ketones, (b) aromatic onium salts, (c) organic peroxides, (d) hexaarylbiimidazole compounds, (e) keto oxime esters, (f) borates, (g) azinium compounds, (h) metallocene compounds, (i) activated esters, and (j) carbon-halogen bond-containing compounds. Preferably, the photopolymerization initiator contains at least one compound selected from the group consisting of -amino ketones, -hydroxy ketones, and acylphosphine oxides.

These initiators are available as, for example, the following trade names: Vicures 10 and 30 (produced Stauffer Chemical); Irgacures 127, 184, 500, 651, 2959, 907, 369, 379, 754, 1700, 1800, 1850, 1870, and 819, OXE01, Darocur 1173, TPO, and ITX (produced by CIBA Specialty Chemicals); Quantacure CTX (produced by Aceto Chemical), Kayacure DETX-S (produced by Nippon Kayaku); and ESACURE KIP 150 (produced by Lamberti). The photopolymerization initiator content in ink composition B is preferably in the range of 1% to 20% by weight, and more preferably in the range of 2% to 10% by weight.

Other additives may be added to ink compositions A and B if necessary. Additives that can be added to the ink compositions include polymerization accelerators, resin emulsions, wetting agents, pH adjusters, surfactants, preservatives, and fungicides. Each type of the additives can be used singly or in combination. If unnecessary, additives may not be added. Those skilled in the art can add an appropriate amount of appropriate additive without departing from the scope of the invention.

Ink compositions A and B are prepared using appropriately constituents selected from the above cited compounds, and preferably have viscosities of less than 25 mPa·s at 20° C. In addition, ink compositions A and B preferably have surface tensions of 45 mN/m or less at 20° C., and more preferably in the range of 25 to 45 mN/m. By controlling the viscosity and the surface tension in those ranges, the resulting ink compositions can have suitable characteristics for ink jet recording. The viscosity and the surface tension can be controlled by adjusting the monomer contents in the ink compositions.

The ink composition can be prepared by, for example, sufficiently mixing the constituents of the ink composition to dissolve them homogenously as much as possible. The resulting solution is pressure-filtered through a membrane filter of 0.8 m in pore size and the filtrate is subjected to deaeration with a vacuum pump. The preparation of the ink composition, however, is not limited to this method.

The set of ink compositions A and B may be used together in a single ink cartridge or separately in different ink cartridges. Such a cartridge containing an ink composition makes the use of the ink compositions easy, and is known in the art. The ink cartridge of the ink composition can be produced by a known method.

The ink cartridge may be used for general writing instruments, recorders, and pen plotters, and is preferably used for ink jet recording.

Ink Jet Recording Method

In an ink jet method according to an embodiment of the invention, the above ink compositions are ejected onto a print medium, and then cured by being irradiated with ultraviolet light.

Ink compositions A and B may be ejected onto the print medium in any order. For example, ink composition A may first be deposited on a print medium, and then ink composition B is deposited on the print medium. Ink compositions A and B can be suitable to be mixed immediately before or after being ejected.

The ink jet head used in the present embodiment includes a plurality of ink containers, and the ejection of inks is controlled for each container. Ink compositions A and B are accommodated in the ink containers so that after droplets of ink composition A are ejected, droplets of ink composition B are ejected to the same positions of the droplets of ink composition A. Then, the mixture of the droplets of ink compositions A and B is irradiated with ultraviolet light to be cured.

A variety of print medium may be used without particular limitation, including plain paper, ink jet paper (matte paper, glossy print), glass, plastics, films, metals, and print wiring boards.

The irradiation with ultraviolet light is performed under appropriate conditions according to the amount and the thickness of the ink compositions applied onto the substrate, the print medium, or the like. Accordingly, the light emitted from the light emitting device preferably has, but not strictly limited to, a wavelength in the range of 350 to 450 nm.

The dose of ultraviolet light is in the range of 10 to 10,000 $mJ/cm^2$, and preferably in the range of 50 to 6,000 $mJ/cm^2$. Such a dose of ultraviolet light sufficiently conducts the curing reaction of the photoradically curable ink composition. For the irradiation with ultraviolet light, a lamp can be used, such as a metal halide lamp, a xenon lamp, a carbon arc lamp, a chemical lamp, a low-pressure mercury lamp, or a high-pressure mercury lamp. A commercially available lamp can be used, such as H Lamp, D Lamp, or V Lamp manufactured by Fusion System Alternatively, an ultraviolet light emitting semiconductor element, such as an ultraviolet light emitting diode (ultraviolet light LED) or an ultraviolet light emitting semiconductor laser may be used to emit ultraviolet light from the viewpoint of reducing the energy consumption.

The photo-curable ink compositions can be ejected by any one of the following methods. An electrostatic suction method may be applied. The electrostatic suction method continuously ejects liquid ink through a nozzle by applying a high electric field between the nozzle and an accelerating electrode disposed in front of the nozzle. While the droplets of the ink pass between deflection electrodes, printing information signals are transmitted to the deflection electrodes to splash the ink droplets onto the print medium. The ink is thus fixed on the print medium, thus recording images. Alternatively, the ink droplets are ejected through the nozzle onto the print medium according to the printing information signals without deflection, and thus images are fixed on the print medium.

In another method, the ink droplets are forced to be ejected through the ink jet nozzle by applying a pressure to the liquid ink with a small pump and mechanically vibrating the nozzle with a quartz resonator or the like. On being ejected through the nozzle, the ink droplets are electrically charged. While the ink droplets pass between the deflection electrodes, printing information signals are transmitted to the deflection electrodes to splash the ink droplets onto the print medium. Thus, images are recorded on the print medium.

In still another method, a piezoelectric element simultaneously applies a pressure and a printing information signal so that ink droplets are ejected through the nozzle onto the print medium. Thus, images are recorded on the print medium.

In further method, the liquid ink is heated to bubble with a microelectrode according to printing information. The expansion of bubbles ejects the liquid ink through the nozzle to a print medium. Thus, images are recorded on the print medium.

Recorded Matter

A recorded matter according to an embodiment of the invention is a record produced by the ink jet recording method using the above-described photo-curable ink composition set. Since the recorded matter is produced by ink jet recording method with the photo-curable ink composition set, the resulting print has high quality and stability with high chromogenicity that can be maintained over a long time.

EXAMPLES

While the invention will further be described in detail with reference to Examples, it is not limited to the Examples. Ink composition sets each including ink compositions A and B shown in Tables 1 to 3 were prepared according to the usual method.

TABLE 1

| | Example 1 | | Example 2 | | Example 3 | | Example 4 | |
|---|---|---|---|---|---|---|---|---|
| | A1 | B1 | A2 | B2 | A3 | B3 | A4 | B4 |
| Monomer VA | 85 | 84.6 | — | — | 80 | 84.2 | 77 | 92.8 |
| VM | — | — | 85 | 84.6 | — | — | — | — |
| Hyperbranched polymer (Biscoat 1000) | 15 | — | 15 | — | 20 | — | 15 | — |
| Irgacure 819 | — | 6 | — | — | — | — | — | 6 |
| Irgacure 1870 | — | — | — | 6 | — | 6 | — | — |
| Irgacure 127 | — | 2 | — | 2 | — | 2 | — | 2 |
| Pigment Black 7 | — | 6 | — | — | — | — | — | — |
| Pigment Blue 15:3 | — | — | — | 6 | — | — | — | — |
| Pigment Violet 19 | — | — | — | — | — | 6 | — | — |
| Pigment Yellow 155 | — | — | — | — | — | — | — | 6 |
| Dispersant (polyoxyalkylene-polyalkylene-polyamine) | — | 1.4 | — | 1.4 | — | 1.8 | — | 1.4 |

TABLE 2

| | Example 5 | | Example 6 | | Example 7 | | Example 8 | |
|---|---|---|---|---|---|---|---|---|
| | A5 | B5 | A6 | B6 | A7 | B7 | A8 | B8 |
| Monomer VA | 97 | 84.8 | 70 | 84.8 | 98 | 84.8 | 69 | 84.8 |
| VM | — | — | — | — | — | — | — | — |
| Hyperbranched polymer (Biscoat 1000) | 3 | — | 30 | — | 2 | — | 31 | — |
| Irgacure 819 | — | 6 | — | 6 | — | 6 | — | 6 |
| Irgacure 1870 | — | — | — | — | — | — | — | — |
| Irgacure 127 | — | 2 | — | 2 | — | 2 | — | 2 |
| Pigment Black 7 | — | 6 | — | 6 | — | 6 | — | 6 |
| Pigment Blue 15:3 | — | — | — | — | — | — | — | — |
| Pigment Violet 19 | — | — | — | — | — | — | — | — |
| Pigment Yellow 155 | — | — | — | — | — | — | — | — |
| Dispersant (polyoxyalkylene-polyalkylene-polyamine) | — | 1.4 | — | 1.4 | — | 1.4 | — | 1.4 |

TABLE 3

| | Comparative Example 1 | | Comparative Example 2 | | Comparative Example 3 | | Comparative Example 4 | |
|---|---|---|---|---|---|---|---|---|
| | A9 | B9 | A10 | B10 | A11 | B11 | A12 | B12 |
| Monomer VA | 92 | 69.6 | — | — | 80 | 84.2 | — | — |
| VM | — | — | — | — | — | — | — | — |
| Isobonyl acrylate | — | — | 80 | 84.2 | — | — | — | — |
| Isobutyl acrylate | — | — | — | — | — | — | 80 | 84.6 |
| Hyperbranched polymer (Biscoat 1000) | — | 15 | 20 | — | — | — | 20 | — |
| Pentaerythritol tetraacrylate | — | — | — | — | 20 | — | — | — |
| Irgacure 819 | 6 | 6 | — | — | — | — | — | 6 |
| Irgacure 1870 | — | — | — | 6 | — | 6 | — | — |
| Irgacure 127 | 2 | 2 | — | 2 | — | 2 | — | 2 |
| Pigment Black 7 | — | 6 | — | — | — | — | — | 6 |
| Pigment Blue 15:3 | — | — | — | — | — | — | — | — |
| Pigment Violet 19 | — | — | — | — | 6 | — | 6 | — |
| Pigment Yellow 155 | — | — | — | — | — | — | — | — |
| Dispersant (polyoxyalkylene-polyalkylene-polyamine) | — | 14 | — | 1.8 | — | 1.8 | — | 1.4 |

More specifically, the constituents shown in Tables 1 to 3 are as follows:

VA: 2-(vinyloxyethoxy)ethyl acrylate expressed by general formula (1);

VM: 2-(vinyloxyethoxy)ethyl methacrylate expressed by general formula (1);

Isobonyl acrylate and isobutyl acrylate: monomers not expressed by general formula (1);

Biscoat 1000 (produced by Osaka Organic Chemical Industry): hyperbranched polymer; and Irgacure 819, Irgacure 1870, and Irgacure 127 (produced by CIBA Specialty Chemicals): polymerization initiators The ink composition sets of Examples 1 to 8 and Comparative Examples 1 to 4 shown in Tables 1 to 3 were evaluated for the following properties.

Ink Viscosity

The viscosities of the prepared inks were measured with a rheometer (MCR-300, manufactured by Physica) and evaluated according to the following criteria:

AA: less than 15 mPa·s

A: 15 mPa·s or more and less than 30 mP·s

B: 30 mPa·s or more

Storage Stability

Ink compositions A1 to A12 and ink compositions B1 to B12 of the two-part photocurable ink composition sets of the examples and comparative examples were allowed to stand at 60° C. for ten days, and the initial viscosities (mPa·s) and the viscosities (mPa·s) after standing under such conditions were measured with a rheometer (MCR-300, manufactured by Physica), and the variation of the viscosities was evaluated according to the following criteria:

AA: Variation between the initial viscosity and the viscosity after standing was within 10%;

A: Variation between the initial viscosity and the viscosity after standing was within 20%; and B: Variation between the initial viscosity and the viscosity after standing was more than 20%.

Capability of Being Cured

Ink composition A and ink composition B were respectively placed in the yellow nozzle line and the cyan nozzle line of an Ink jet printer PX-G920 (manufactured by Seiko Epson), and a pattern was printed in the same manner as a green image is formed on a PET film at room temperature and normal pressure (in practice, the print color depends on the color of the ink placed in the yellow nozzle line, and thus the ink placed in the other nozzle line can be superimposed).

Then, the pattern was irradiated with ultraviolet lights having wavelengths of 365 nm, 380 nm, and 395 nm at a dose of 150 mW/cm² from an ultraviolet light emitting device. When a tacky touch of the surface of the test piece was lost, it was determined that the ink was cured. The capability of being cured was evaluated according to the following criteria:

AA: cured by irradiation for 1 minute;
A: cured by irradiation for 3 minutes; and
B: not cured even by irradiation for 5 minutes.

Film Strength

The printed ink samples were irradiated for 10 minutes to be cured by the same light emitting device. After being cured, the prints were visually observed to evaluate the surface states according to the following criteria:

A: not scratched by rubbing with nails
B: scratched by rubbing with nails

Film Quality

The printed samples were irradiated for 10 minutes to be cured by the same light emitting device. After being cured, the prints were allowed to stand at room temperature and normal pressure for three days, and then the film qualities were observed for evaluation according to the following criteria:

AA: no warp resulting from shrinkage by curing was observed.
A: a warp of less than 3 cm was observed in the film.
B: a warp of 3 cm or more was observed in the film.

Flash Point

The prepared ink compositions were measured for flash point with a Seta Closed-cup flash point tester (Model 13740-2, manufactured by Tanaka Scientific Ltd.) according to the following criteria:

A: 70° C. or more
B: less than 70° C.

Tables 4 to 6 show the viscosities, storage stabilities, and flash points of the ink compositions and the capabilities of being cured, film strengths, and film qualities of the prints.

TABLE 4

| | Example | | | | | | | |
|---|---|---|---|---|---|---|---|---|
| | 1 | | 2 | | 3 | | 4 | |
| | A1 | B1 | A2 | B2 | A3 | B3 | A4 | B4 |
| Ink viscosity | AA | AA | AA | AA | AA | AA | AA | AA |
| Storage stability | AA | AA | AA | AA | AA | AA | A | AA |
| Flash point | A | A | A | A | A | A | A | A |
| Capability of being cured | A | | A | | A | | A | |
| Film strength | A | | A | | A | | A | |
| Film quality | AA | | AA | | AA | | AA | |

TABLE 5

| | Example | | | | | | | |
|---|---|---|---|---|---|---|---|---|
| | 5 | | 6 | | 7 | | 8 | |
| | A5 | B5 | A6 | B6 | A7 | B7 | A8 | B8 |
| Ink viscosity | AA | AA | AA | AA | AA | AA | A | AA |
| Storage stability | AA | AA | AA | AA | AA | AA | AA | AA |
| Flash point | A | A | A | A | A | A | A | A |
| Capability of being cured | A | | A | | A | | A | |
| Film strength | A | | A | | A | | A | |
| Film quality | AA | | AA | | A | | AA | |

TABLE 6

| | Comparative Example | | | | | | | |
|---|---|---|---|---|---|---|---|---|
| | 1 | | 2 | | 3 | | 4 | |
| | A9 | B9 | A10 | B10 | A11 | B11 | A12 | B12 |
| Ink viscosity | AA | B | B | B | AA | AA | AA | AA |
| Storage stability | AA | B | A | A | AA | AA | — | — |
| Flash point | A | A | A | A | A | A | B | B |
| Capability of being cured | A | | B | | A | | B | |
| Film strength | A | | A | | B | | A | |
| Film quality | AA | | AA | | B | | A | |

The ink composition set according to the embodiment of the invention have low viscosity, is superior in safety and stable in storage, and can easily be cured. Films formed by printing the ink composition set exhibit high quality. The ink composition set, and the ink jet recording method and recorded matter using the ink composition sets can be advantageously used in industry.

The entire disclosure of Japanese Patent Application No: 2007-207237, filed Aug. 8, 2007 is expressly incorporated by reference herein.

What is claimed is:

1. A photocurable ink composition set comprising:
ink composition A comprising a dendritic polymer and a monomer expressed by general formula (I): $CH_2=CR^1-COO-R^2-O-CH=CH-R^3$; and
ink composition B containing a coloring agent and a monomer expressed by general formula (I),
wherein $R^1$ represents a hydrogen atom or a methyl group, $R^2$ represents an organic moiety having 2 to 20 carbon atoms, and $R^3$ represents a hydrogen atom or an organic moiety having 1 to 11 carbon atoms.

2. The photocurable ink composition set according to claim 1, wherein only the ink composition B further contains a photopolymerization initiator.

3. The photocurable ink composition set according to claim 1, wherein the photopolymerization initiator comprises at least one selected from the group consisting of -amino ketones, -hydroxy ketones, and acylphosphine oxides.

4. The photocurable ink composition set according to claim 1, wherein the dendritic polymer is at least one of a dendrimer or a hyperbranched polymer.

5. The photocurable ink composition set according to claim 1, wherein the monomers are at least one of 2-(vinyloxyethoxy)ethyl acrylate or 2-(vinyloxyethoxy)ethyl methacrylate.

6. The photocurable ink composition set according to claim 1, wherein the dendritic polymer content is in the range of 3% to 30% by weight.

7. An ink jet recording method comprising the steps of: ejecting an ink composition of the photocurable ink composition set as set forth in claim 1, and curing said ink composition with light.

8. The ink jet recording method according to claim 7, wherein the photocurable ink composition set is cured with a light emitting diode having a wavelength in the range of 365 to 385 nm.

9. A recorded matter made by the process of recording with the photocurable ink composition set as set forth in claim 1.

10. An ink jet printing apparatus comprising the photocurable ink composition as set forth in claim 1.

* * * * *